United States Patent
Fereidouni et al.

(10) Patent No.: US 11,774,361 B2
(45) Date of Patent: Oct. 3, 2023

(54) WAVEGUIDE-BASED SIDE-ILLUMINATION TECHNIQUE FOR MUSE MICROSCOPY AND ASSOCIATED HISTOLOGY CASSETTES

(71) Applicant: The Regents of the University of California, Oakland, CA (US)

(72) Inventors: Farzad Fereidouni, Sacramento, CA (US); Richard M. Levenson, Davis, CA (US)

(73) Assignee: The Regents of the University of California, Oakland, CA (US)

(*) Notice: Subject to any disclaimer, the term of this patent is extended or adjusted under 35 U.S.C. 154(b) by 959 days.

(21) Appl. No.: 16/610,479

(22) PCT Filed: May 3, 2018

(86) PCT No.: PCT/US2018/030977
§ 371 (c)(1),
(2) Date: Nov. 1, 2019

(87) PCT Pub. No.: WO2018/204712
PCT Pub. Date: Nov. 8, 2018

(65) Prior Publication Data
US 2020/0150042 A1  May 14, 2020

Related U.S. Application Data

(60) Provisional application No. 62/501,372, filed on May 4, 2017.

(51) Int. Cl.
*G01N 21/64* (2006.01)
*G02B 1/14* (2015.01)
(Continued)

(52) U.S. Cl.
CPC ............ *G01N 21/6458* (2013.01); *B01L 9/52* (2013.01); *G01N 1/30* (2013.01); *G01N 1/312* (2013.01);
(Continued)

(58) Field of Classification Search
None
See application file for complete search history.

(56) References Cited

U.S. PATENT DOCUMENTS 5,493,393 A   2/1996   Beranek et al.
5,925,878 A   7/1999   Challener
(Continued)

OTHER PUBLICATIONS

International Search Report, PCT/US2018/030977, ISA/US Commissioner for Patents, Blaine R. Copenheaver, dated Sep. 11, 2018.

*Primary Examiner* — Elmito Breval
(74) *Attorney, Agent, or Firm* — Park, Vaughan, Fleming & Dowler LLP

(57) ABSTRACT

During operation of the system, a sample of the biological material is placed against a surface of a waveguide, which is comprised of a UV-transparent waveguide material. Then, the system launches UV light from a UV light source via side-illumination into an input end of the waveguide, wherein a launch angle for components of the UV light is greater than a critical angle between the waveguide material and air, so that the UV light propagates through the waveguide via total internal reflection to reach the sample. The launch angle is also less than a critical angle between the waveguide material and the sample, so that when the UV light reaches the sample, the UV light escapes the waveguide through refraction to illuminate the sample. Finally, an imaging mechanism located on an opposite side of the waveguide from the sample captures an image of the illuminated sample.

27 Claims, 20 Drawing Sheets
(4 of 20 Drawing Sheet(s) Filed in Color)

(51) Int. Cl.
- *B01L 9/00* (2006.01)
- *G01N 1/30* (2006.01)
- *G01N 1/31* (2006.01)
- *G01N 1/36* (2006.01)
- *F21V 8/00* (2006.01)
- *G02B 21/06* (2006.01)
- *G02B 21/16* (2006.01)
- *G02B 21/36* (2006.01)

(52) U.S. Cl.
CPC ........... *G01N 1/36* (2013.01); *G01N 21/6428* (2013.01); *G02B 1/14* (2015.01); *G02B 6/0038* (2013.01); *G02B 6/0065* (2013.01); *G02B 6/0068* (2013.01); *G02B 21/06* (2013.01); *G02B 21/16* (2013.01); *G02B 21/36* (2013.01); *B01L 2300/021* (2013.01); *B01L 2300/0822* (2013.01); *G01N 2021/6439* (2013.01)

(56) References Cited

U.S. PATENT DOCUMENTS

| | | |
|---|---|---|
| 2002/0154399 A1 | 10/2002 | Eastman et al. |
| 2003/0035640 A1 | 2/2003 | Dugan et al. |
| 2009/0022448 A1 | 1/2009 | Wu et al. |
| 2015/0168702 A1 | 6/2015 | Harris |
| 2016/0077007 A1 | 3/2016 | Demos et al. |
| 2016/0131583 A1 | 5/2016 | Bamford et al. |

OBLIQUE ILLUMINATION

SIDE-LAUNCH ILLUMINATION

WAVEGUIDE-BASED SIDE-ILLUMINATION TECHNIQUE FOR MUSE MICROSCOPY AND ASSOCIATED HISTOLOGY CASSETTES

RELATED APPLICATION

This application claims priority under 35 U.S.C. § 119 to U.S. Provisional Application No. 62/501,372, entitled "Waveguide Illumination for MUSE Spectroscopy Featuring Disposable and Non-Disposable Components for Upright and Inverted Microscopes" by the same inventors as the instant application, filed on 4 May 2017, the contents of which are incorporated by reference herein.

GOVERNMENT LICENSE RIGHTS

This invention was made with U.S. government support under grant numbers 1R21CA183660 and R33-CA202881-03 awarded by the National Institutes of Health (NIH). The U.S. government has certain rights in the invention.

BACKGROUND

Field

The disclosed embodiments relate to techniques for characterizing biological materials by analyzing light emissions induced by ultra-violet (UV) surface excitation. More specifically, the disclosed embodiments relate to a waveguide-based, side-illumination technique to facilitate microscopy with UV surface excitation (MUSE).

Related Art

Microscopy with UV Surface Excitation (MUSE) is a recently developed microscopy technique that uses UV photons, which have a shallow penetration depth, to induce fluorescent light emissions in samples of biological material with histology-grade resolution. Compared to conventional microscopy techniques, which typically require sectioning to exclude blurred signals from outside of the focal plane, MUSE's low penetration depth limits the excitation volume to a thin layer, and as a consequence removes the tissue sectioning requirement. (See https://en.wikipedia.org/wiki/Microscopy_with_UV_surface_excitation.)

Previously developed MUSE systems make use of oblique illumination, which directly illuminates the imaged tissue area by shining excitation light through a UV-transparent support at an oblique angle. This configuration eliminates the need for a dichroic mirror for excitation launch, which simplifies setup and also increases coupling efficiency by avoiding losses. This approach, in contrast to conventional epifluorescence-based designs, also eliminates the need to use UV-transmitting or reflective objectives. In spite of its uncomplicated features and straightforward utilization, this technique suffers from several drawbacks. First of all, it requires proper alignment to direct the light into the designated illumination area effectively. Moreover, this geometry poses a problem because the close proximity of the illumination sources can interfere with the ability of high-magnification, high-numerical-aperture objective lenses to be placed close enough to the tissue, and the necessary excitation launch optics also make it difficult to switch objective lenses. Even using relay optics, which move the light-emitting diodes (LEDs) further from the sample, is not helpful because the objective needs to get very close to the sample, and thus occludes the remotely launched excitation light. Also, the use of only a single light source on one side of the objective provides non-uniform illumination, which needs to be dealt with by using multi-point illumination, software correction or some other mechanism.

Hence, what is needed is technique for providing UV excitation for MUSE microscopy without the above-described problems with existing techniques.

SUMMARY

The disclosed embodiments relate to system that uses side-illumination to image a sample of a biological material using ultra-violet (UV) light. During operation, the sample of the biological material is placed against a surface of a waveguide, which is comprised of a UV-transparent waveguide material, which in some instances is equipped with additional optical modifying components. Then, the system launches UV light from a UV light source via side-illumination into an input end of the waveguide, wherein a launch angle for components of the UV light is greater than a critical angle between the waveguide material and air, whereby the UV light propagates through the waveguide via total internal reflection to reach the sample. The launch angle is also less than a critical angle between the waveguide material and the sample, so that when the UV light reaches the sample, the UV light escapes the waveguide via refraction to illuminate the sample. Finally, the system uses an imaging mechanism located on an opposite side of the waveguide from the sample to capture an image of the illuminated sample. This configuration, termed "shallow-angle fluorescence microscopy" (SAFM) has been described for visible-range and near-UV range excitation, but because of the exponential intensity loss across the length of the waveguide, it has only been demonstrated at cellular scale, because larger areas of suitably bright and even illumination needed for centimeter-scale tissue imaging are not obtainable without modification.

In some embodiments, prior to imaging, the sample is exposed to one or more stains, which preferentially accumulate in the biological material or in cellular components of the biological material to facilitate fluorescent imaging.

In some embodiments, a refractive index of the waveguide increases along a length of the waveguide to compensate for decreasing illumination intensity due to attenuation of the UV light as the UV light propagates through the waveguide.

In some embodiments, a thin layer is fabricated on the waveguide, having a refractive index lower than the waveguide, which causes shallow-angle light to escape into the sample in a manner that provides more uniform illumination. Also, a high-frequency grating is fabricated on the thin layer, which redirects the escaped shallow-angle light at a sharper angle to increase penetration depth into the sample.

In some embodiments, the high-frequency grating includes one or more protective layers to protect the high-frequency grating during washing and staining of the sample.

In some embodiments, the system illuminates the sample using one or more additional light sources in a spectral range from UV to near-infra-red (IR) for excitation of endogenous or exogenous fluorescent moieties.

In some embodiments, the UV light includes multiple wavelengths of UV excitation light.

In some embodiments, the waveguide comprises a UV-transparent window in a histology cassette, which encloses the sample.

In some embodiments, the waveguide comprises a UV-transparent microscope cover slip to facilitate imaging a sectioned sample of biological material on a microscope slide.

In some embodiments, launching the UV light into the waveguide involves launching the UV light into a prism, which is attached to a surface of the waveguide.

In some embodiments, the waveguide includes an angled internal reflective surface, and launching UV light into the waveguide involves launching the UV light into a surface of the waveguide so that the UV light reflects off the angled internal reflective surface in directions substantially parallel to the surface of the waveguide.

In some embodiments, the waveguide comprises a planar waveguide with a circular shape, and the UV light is launched into the waveguide from multiple locations along a circular perimeter of the waveguide.

In some embodiments, the waveguide is composed of one or more of the following materials: sapphire; $CaF_2$; fused silica; quartz; and UV-transparent plastic.

In some embodiments, the waveguide is transmissive in a range from 200 nm into near-IR.

In some embodiments, the UV light source includes one or more of the following: a UV light-emitting diode (LED); a UV laser; and a UV lamp.

The disclosed embodiments also relate to a cassette similar to those used in routine histology processing, equipped with an ultra-violet (UV) transparent window. This histology cassette includes an enclosure for holding a sample of biological material, wherein the enclosure includes openings to facilitate fluid exchange with the sample and drainage, and also includes an openable lid to facilitate insertion and removal of the sample. The enclosure additionally enclosure a ultra-violet (UV) transparent window, which facilitates illuminating the sample with UV light for fluorescent imaging of the sample while the sample remains inside the enclosure.

In some embodiments, the UV-transparent window comprises a waveguide, which is adapted to receive and carry UV light from a side-illumination source, which is coupled to an input end of the waveguide, so that the UV light escapes through refraction at a boundary between the waveguide and the sample to illuminate the sample for imaging purposes.

In some embodiments, the UV-transparent window is located in a lid of the histology cassette, or in a base of the histology cassette.

In some embodiments, the histology cassette is adapted to be incorporated into a microscope stage.

In some embodiments, the histology cassette is bar-coded or otherwise labeled for sample tracking and subsequent processing.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1A:
FIG. 1A presents a MUSE image produced using oblique illumination in accordance with the disclosed embodiments.
Figure 1B:
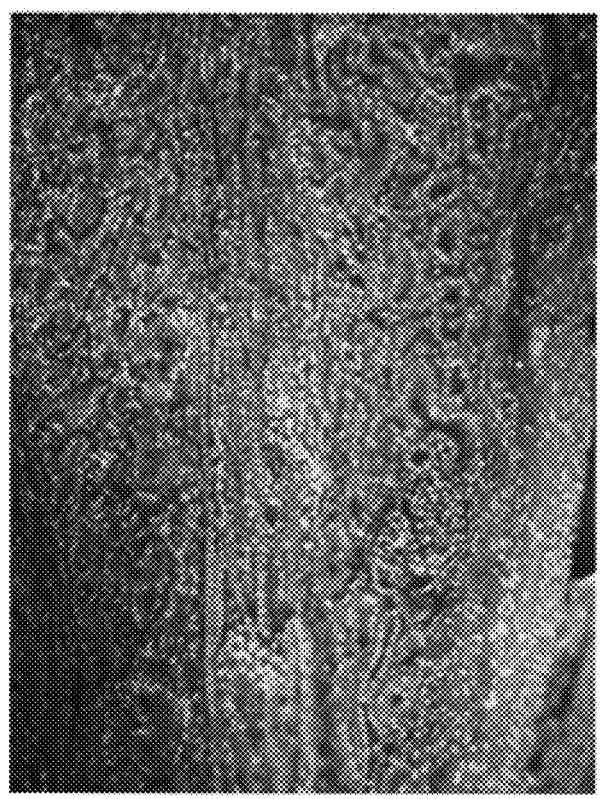
FIG. 1B presents a MUSE image produced using side-launch illumination in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules. The methods and processes described in the detailed description section can be embodied as code and/or data, which can be stored in a computer-readable storage medium as described above.

DISCUSSION

The disclosed embodiments provide a waveguide-based side-illumination technique for imaging a sample of a biological material using ultra-violet (UV) light. They also provide a technique for storing, labeling and illuminating stained or non-stained biological samples for histopathology assessment. The disclosed embodiments additionally provide a mechanism for retrofitting a regular microscope to take advantage of short-wavelength UV illumination associated with MUSE imaging techniques. It has been previously shown that using UV light to image biological tissues is a beneficial feature where the UV light is absorbed within 5-10 μm of the sample. This feature provides an "optical sectioning" property, which removes the requirement for physical sectioning and conventional sample preparation. However, in conventional fluorescence microscopy, excitation light is typically directed through a dichroic mirror into an objective lens, and the emitted fluorescence light is collected using the same objective. There exist some UV-compatible optics, but they are expensive and limited in terms of the magnification and numerical aperture (NA) they provide.

Previous MUSE techniques made use of oblique illumination, which directly illuminates the imaged tissue area by shining excitation light through a UV-transparent support at an oblique angle. This configuration eliminates the need for a dichroic mirror for excitation launch, which simplifies the setup and also increases coupling efficiency. In spite of its uncomplicated features and straightforward utilization, this technique suffers from several drawbacks. First, it requires proper alignment to direct the light into the designated illumination area effectively. The geometry also creates a problem in that the close proximity of the illumination sources can interfere with the ability of high-magnification, high-NA objective lenses to be located close enough to the tissue, and makes it difficult to switch objectives. Even using relay optics, which move the LEDs further from the sample, is not helpful because the objective needs to get very close to the sample, and thus still occludes the remotely launched excitation light. Also, employing only one light source on one side of the objective provides a non-uniform illumination, which needs to be resolved by multi-point illumination, software correction or some other technique.

The disclosed embodiments provide a new side-illumination technique for illuminating a tissue sample. This new technique facilitates moving light sources away from the objective, and thereby allows the use of any lens, even those with short working distances, for imaging. More specifically, the disclosed embodiments operate by guiding the light into a UV-transparent waveguide in which light propagation occurs via total internal reflection (TIR), confining the light inside the waveguide. The UV light propagates through the waveguide until it reaches an area where another object (i.e., the sample or surface with a lower refractive index) with a refractive index close to that of the waveguide is in direct contact with the waveguide. At this point, the TIR condition is no longer met, and the light crosses the waveguide through refraction to enter the sample at some angle, and in doing so illuminates a surface of the sample. Because the excitation comes in from the side, and not obliquely, objectives can be placed much closer to the sample without physical hindrance. This technique is limited only by the thickness of the waveguide, which has to be a certain minimum width to sustain light propagation, and hence facilitates using objectives with higher numerical apertures and magnifications.

The use of UV light is advantageous, because it restricts the depth of penetration to a few microns, and provides surface-weighted imaging. Unlike true total internal reflection fluorescence (TIRF), which only allows an evanescent field to excite objects within a few nanometers of the substrate-sample interface, this technique uses non-TIRF conditions to provide deeper penetration. However, only modest transverse areas (<approximately 3 mm), can be illuminated with reasonable uniformity using an unmodified waveguide. This is suitable for examining small specimens (needle or forceps-acquired biopsy material for example). Larger specimens, with dimensions on the inch-scale cannot be viewed due to rapid decay of the illumination light once it hits the specimen and starts to escape. Additional means employing coatings with variable refractive indices (with or without additional high-spatial-frequency gratings), are subsequently described in this disclosure and can provide much more even illumination profiles across larger areas.

A number of specific geometries for light launch are described below, which involve one or multiple sources at the same or different launch angles, and which can excite different depths in the tissue. Moreover, the arrangement can be improved by adding reflective material at some or most of the lateral edges of the waveguide to reflect the light back again towards the sample, improving brightness and uniformity. Variations can involve using one or more wavelengths of light in the UV range (typically around 300 nm and shorter), which can be used to refine depth information or for excitation-informed multispectral imaging.

In addition, other optical excitation sources in spectral ranges more typically used in conventional fluorescence microscopy can be included to provide increased sensitivity for detection of immunofluorescence signals, which can be much less bright than samples stained with typical MUSE dyes. Note that these additional excitation sources in the visible range may require the use of excitation and emission filters and possibly dichroic mirrors for launch, and can be used in combination with MUSE, which provides a high-quality morphological context.

However, a potential problem can arise from interference rings formed at the sample-waveguide interface. This is expected due to the Fabry-Perot configuration of the waveguide. For an LED with central wavelength of 300 nm and a spectral width of 10 nm, the coherence length is less than 6 μm. In practice, for waveguides with 150-300 micron thicknesses, such rings should not pose a problem. We can also cover the edges of the waveguide with aluminum (or another reflective material) to improve the distribution of the light over the tissue.

Figure 2:
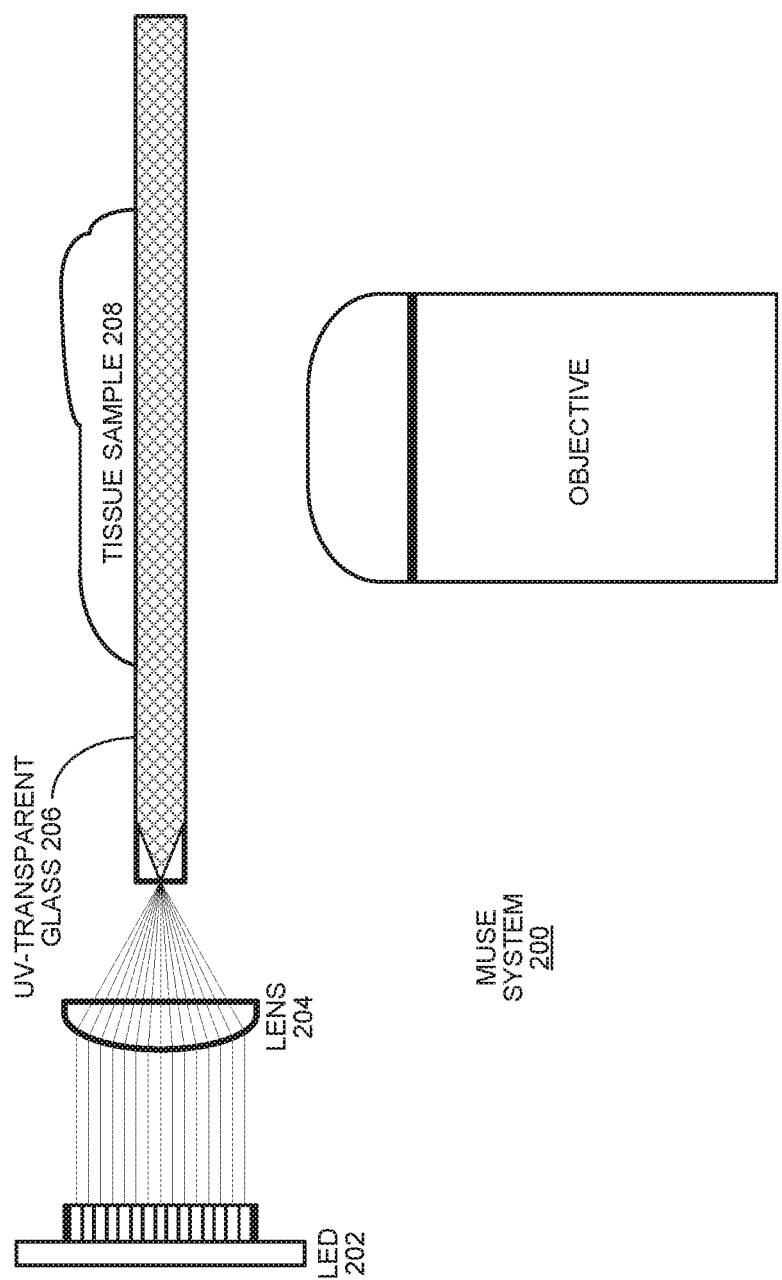
FIG. 2 illustrates a system that side-launches UV excitation into a waveguide using a focusing lens in accordance with the disclosed embodiments.

FIG. 2 illustrates a MUSE system 200, which side-launches UV excitation into a waveguide comprising UV-transparent glass 206 using a focusing lens 204 in accordance with the disclosed embodiments. The UV light, which can be provided via an LED 202 or laser, is focused from the side of a specimen interface (composed of sapphire, $CaF_2$, fused silica, quartz, and the like, or UV-transparent glass or plastic), which behaves as a planar waveguide. Note that the numerical aperture of the lens and the waveguide should preferably match for optimum coupling. With unmodified waveguides, the light propagates until it reaches the tissue sample 206, where the refractive index of the sample and the waveguide are close to each other. This provides a situation for light to escape the waveguide through refraction and illuminate the tissue sample 206.

As illustrated in FIG. 2, light from LED 202 is focused using a lens 204 into the UV-transparent glass 206 holding the tissue, which behaves as waveguide. The refractive index for tissue sample 206 is in the range of 1.3~1.4. In order to provide a condition for the light to penetrate into tissue, the refractive index of the waveguide should ideally be in the same range.

Figure 4:
FIG. 4 presents an exemplary image taken through a UV-transparent window in accordance with the disclosed embodiments.
Figure 3:
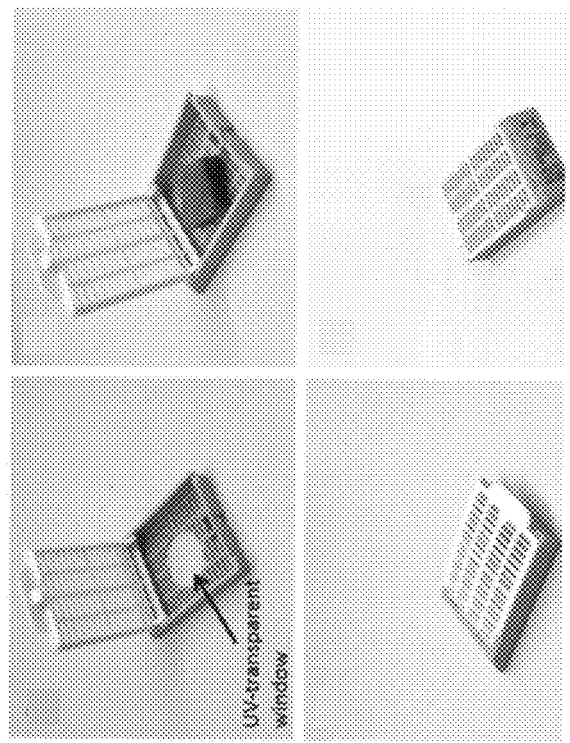
FIG. 3 presents several views of a histology cassette with a UV-transparent window in accordance with the disclosed embodiments.
Figure 5:
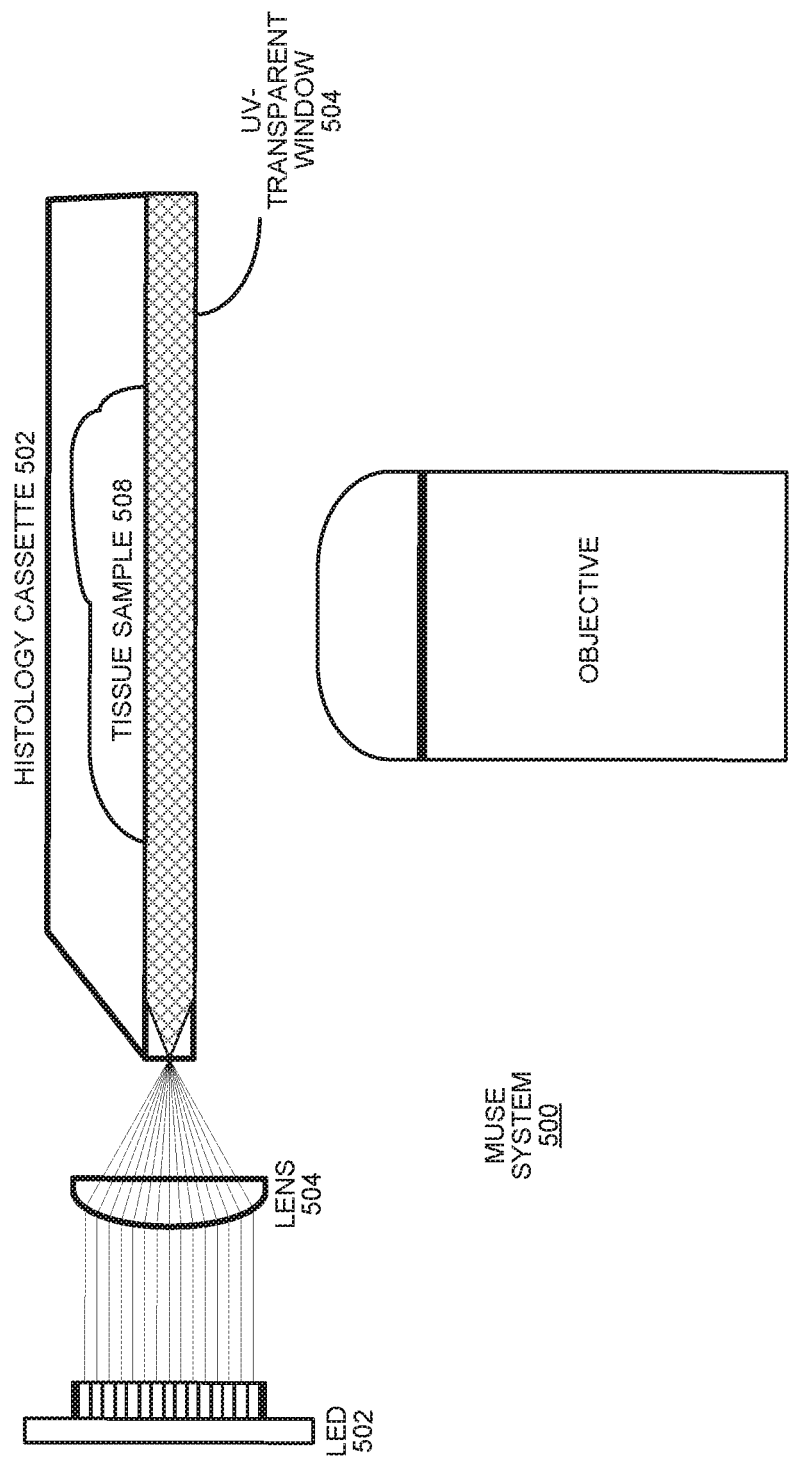
FIG. 5 illustrates a MUSE system configured to use a histology cassette with an embedded UV-transparent waveguide in accordance with the disclosed embodiments.

This method of waveguide-based UV excitation launch can be implemented using plastic modules resembling typical histology cassettes, which have been modified to embed a thin UV transparent window which supports the light guiding. Note that histology cassettes provide a useful solution for tracking, labeling and storing tissues. Moreover, it is possible to modify a regular histology cassette to make it suitable for UV imaging. For example, the bottom or the top of the cassette can be replaced with a UV-transparent optical window, which functions as a waveguide, so that the tissue comes into the contact with the window as is illustrated in FIG. 3. Alternatively, the imaging window in the cassette can be provided by a flexible (rather than rigid) UV-transparent film, and the cassette would then be placed adjacent to the waveguide, now part of the instrument, perhaps with an intervening thin layer of water or other index-matching fluid. These modified histology cassettes can be used to produce a resulting image, which is illustrated in FIG. 4. FIG. 5 illustrates an exemplary MUSE system 500 based on a histology cassette 502, wherein UV excitation light from LED 502 is side-launched into a UV-transparent window 504 using a lens 504 to illuminate a tissue sample 508.

Figure 6:
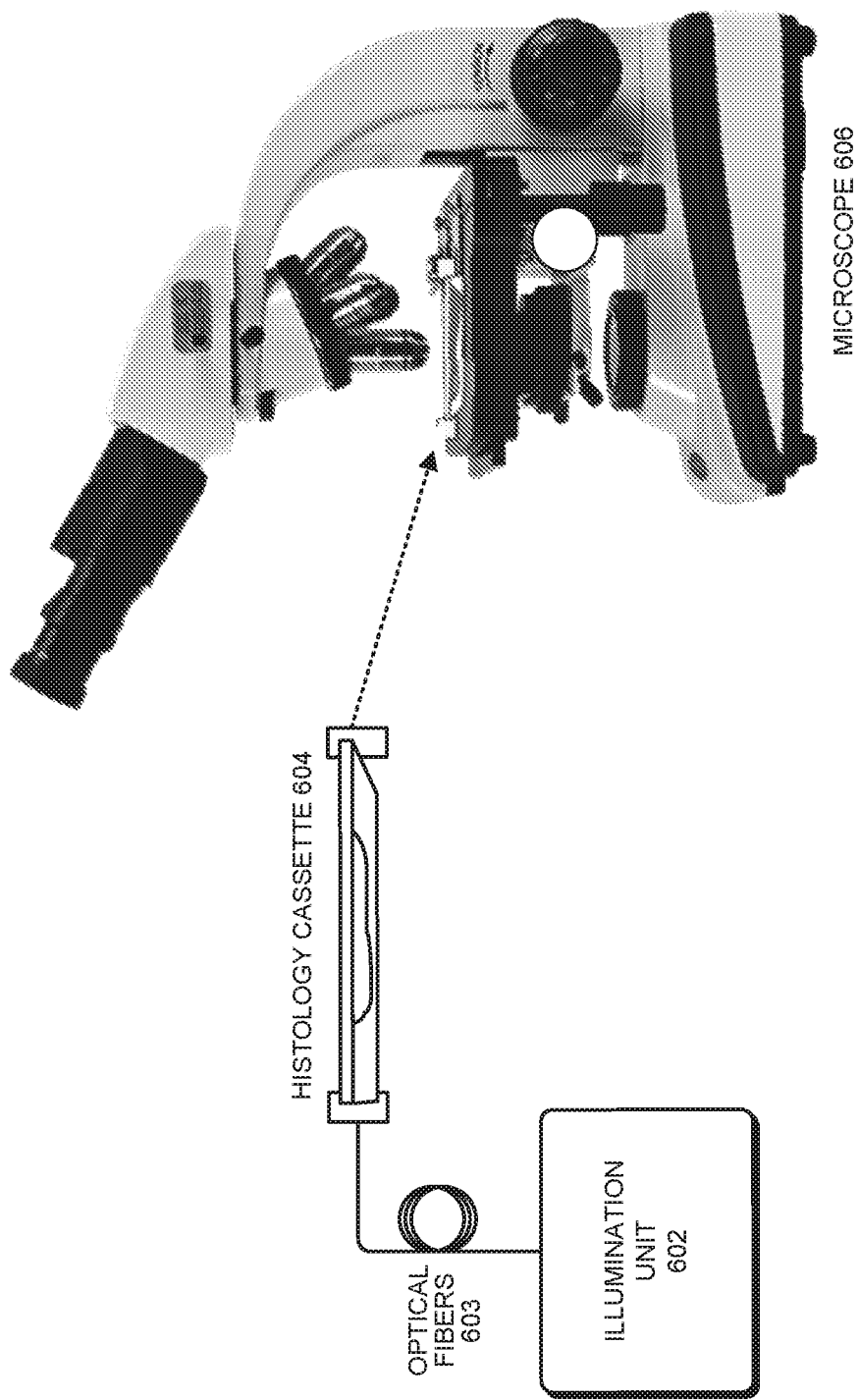
FIG. 6 illustrates a MUSE enclosure configured to be used on a regular microscope in accordance with the disclosed embodiments.

FIG. 6 illustrates an embodiment where an illumination unit 602, which generates multiple wavelengths in the UV region, is situated near a microscope 606. The generated UV light can be guided by optical fibers 603 into a modified histology cassette 604, which sits on a regular microscope 606. Note that this system can be used to convert any regular microscope into a MUSE system. The use of a conventional microscope plus emission filters (that can be placed in the location typically used for polarization elements) with waveguide illumination can be very useful. Alternatively, MUSE imaging can be performed with waveguide illumination on a fluorescence-equipped conventional microscope, followed by epifluorescence microscopy after attenuation of MUSE dye fluorescence if necessary.

Figure 7:
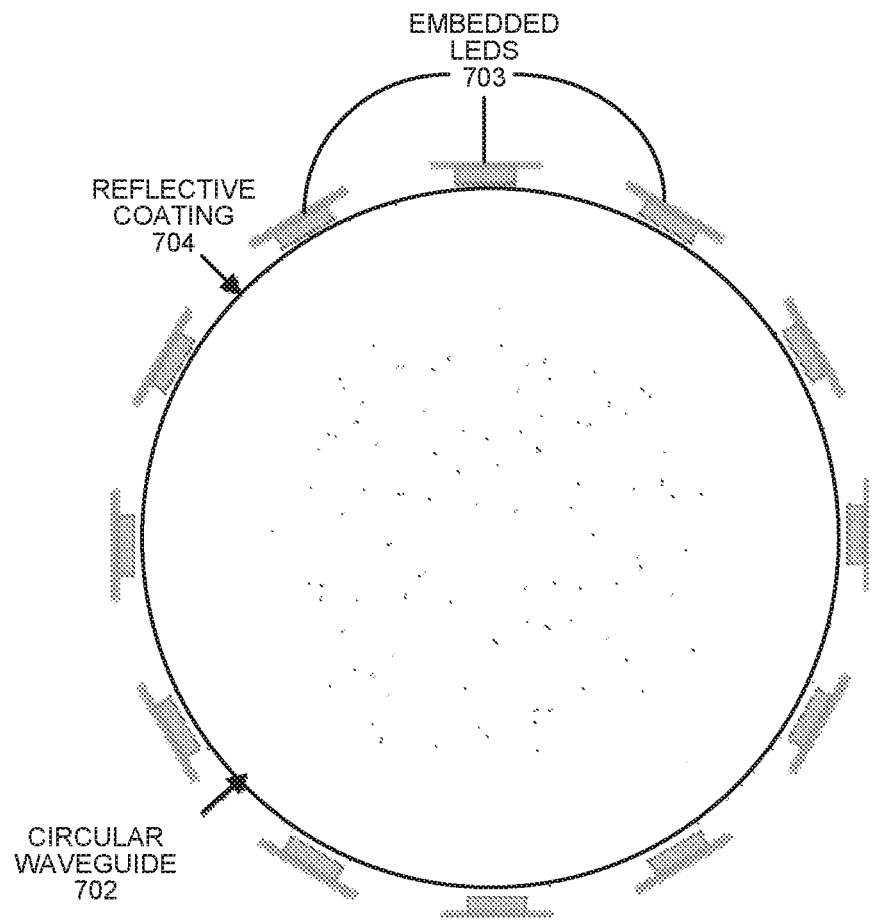
FIG. 7 illustrates a circular array of LEDs embedded in a perimeter of a circular piece of UV-transparent glass in accordance with the disclosed embodiments.

Note that LED chips can be as small as 200 μm. Hence, all the previously described configurations can be implemented using LEDs embedded into waveguides without any optics. This also makes it possible to increase the input power by constructing a circumferential waveguide 702 with a surrounding ring of embedded LEDs 703 as is illustrated in FIG. 7. Note that uncovered portions of the circumferential waveguide 702 can have a reflective coating 704 to enhance the coupling efficiency.

Note that the LEDs in the previous configurations can be replaced with different colors of LEDs to increase the information content from the image. This helps to selectively excite different components and to setup a spectral imaging system using excitation spectra. Moreover, by using different colors of LEDs, there is no requirement for changing the dichroic or filters.

Figure 8:
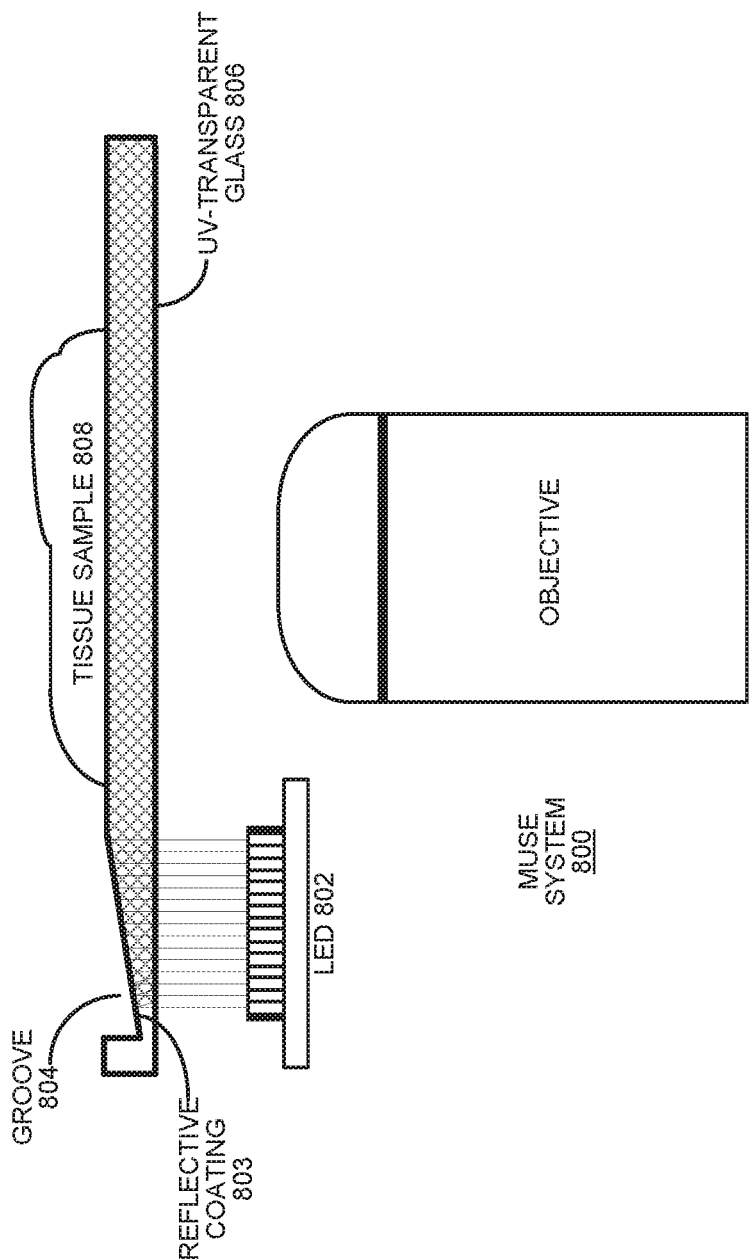
FIG. 8 illustrates an angled-launch configuration for coupling excitation light into the waveguide in accordance with the disclosed embodiments.

FIG. 8 illustrates a reflective-coating-enabled angled launch configuration for optimally coupling the light inside the wave-guide. Light from an LED 802 is introduced from the bottom or the surface of the waveguide comprising UV-transparent glass 806, which has a groove 804. An opposing angled surface of waveguide 806 within a groove 804 includes a reflective coating 803 to reflect the light received from LED 802 inside waveguide 806. Note that the angle of groove 804 is selected to it guarantee the TIR angle inside the waveguide and penetration into the tissue.

Figure 9:
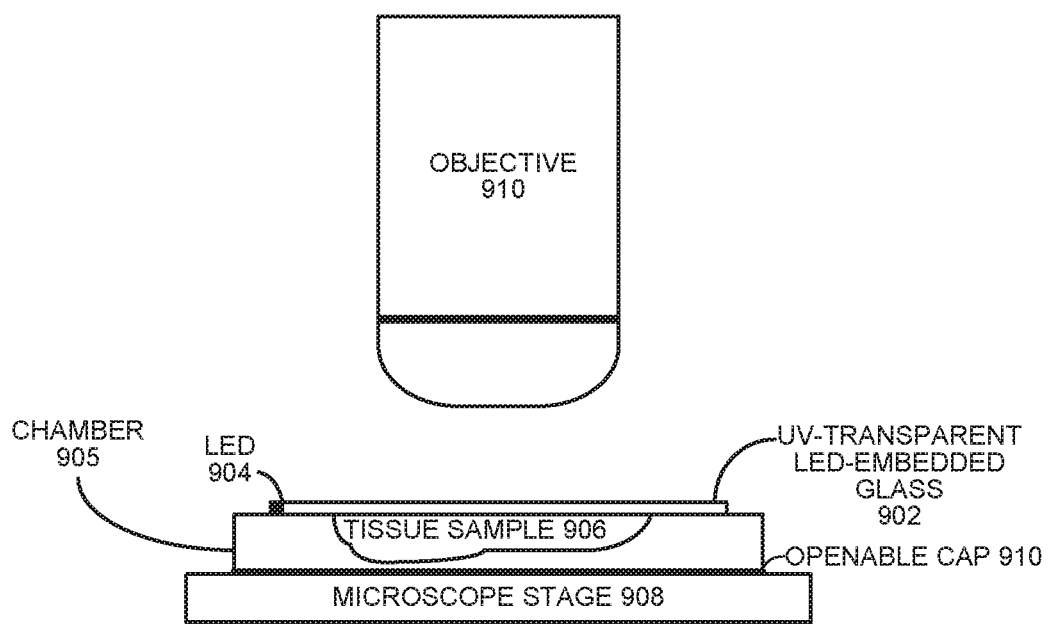
FIG. 9 illustrates another configuration with an LED-embedded chamber on a microscope stage in accordance with the disclosed embodiments.

By properly designing a chamber for the tissue sample, which is equipped with a UV transparent window, stained samples can be observed using conventional microscopes. For example, FIG. 9 illustrates configuration with chamber 905, which holds a tissue sample 906 on a microscope stage 908 in accordance with the disclosed embodiments. This chamber 905 includes a surface with UV-transparent LED-embedded glass 902 (with an embedded LED 904), and a surface with an openable cap 910.

Figure 10:
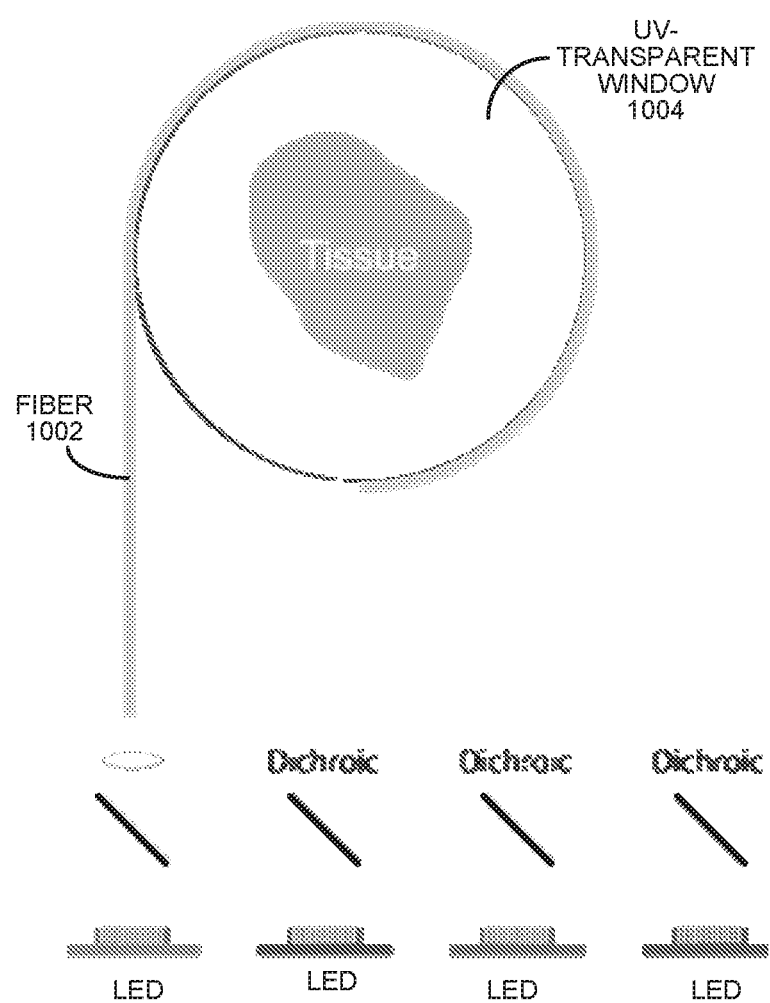
FIG. 10 illustrates light from multiple colored LEDs launched into a fiber and then launched into a UV transparent window in accordance with the disclosed embodiments.

In other embodiments, the system uses multi-wavelength illumination, which is launched from a single fiber into the UV-transparent waveguide, to refine depth information or for excitation-based multispectral imaging. For example, see FIG. 10, which illustrates how light from multiple spectrally distinct LEDs can be launched into a fiber 1002, and then launched into a UV-transparent window 1004. This makes it possible to use more than one wavelength in the UV range for excitation spectroscopy.

Figure 11:
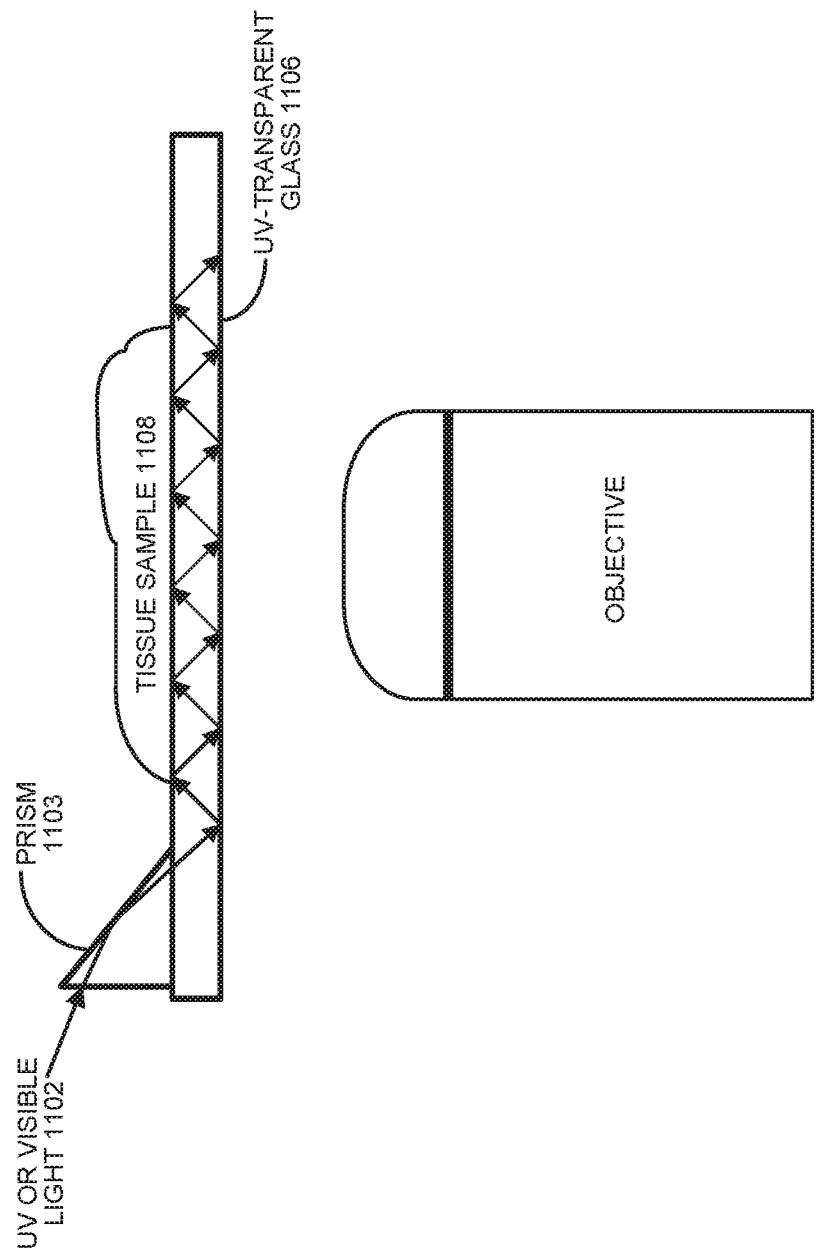
FIG. 11 illustrates a prism-based launch of excitation light into the UV-transparent glass in accordance with the disclosed embodiments.

As mentioned above, in some embodiments, UV light can be launched into the waveguide using a prism, which is attached to a surface of the waveguide. For example, FIG. 11 illustrates a system, which uses a prism 1103 to launch UV or other light 1102 into a waveguide comprising thin UV-transparent glass 1106 to illuminate a tissue sample 1108.

Figure 12:
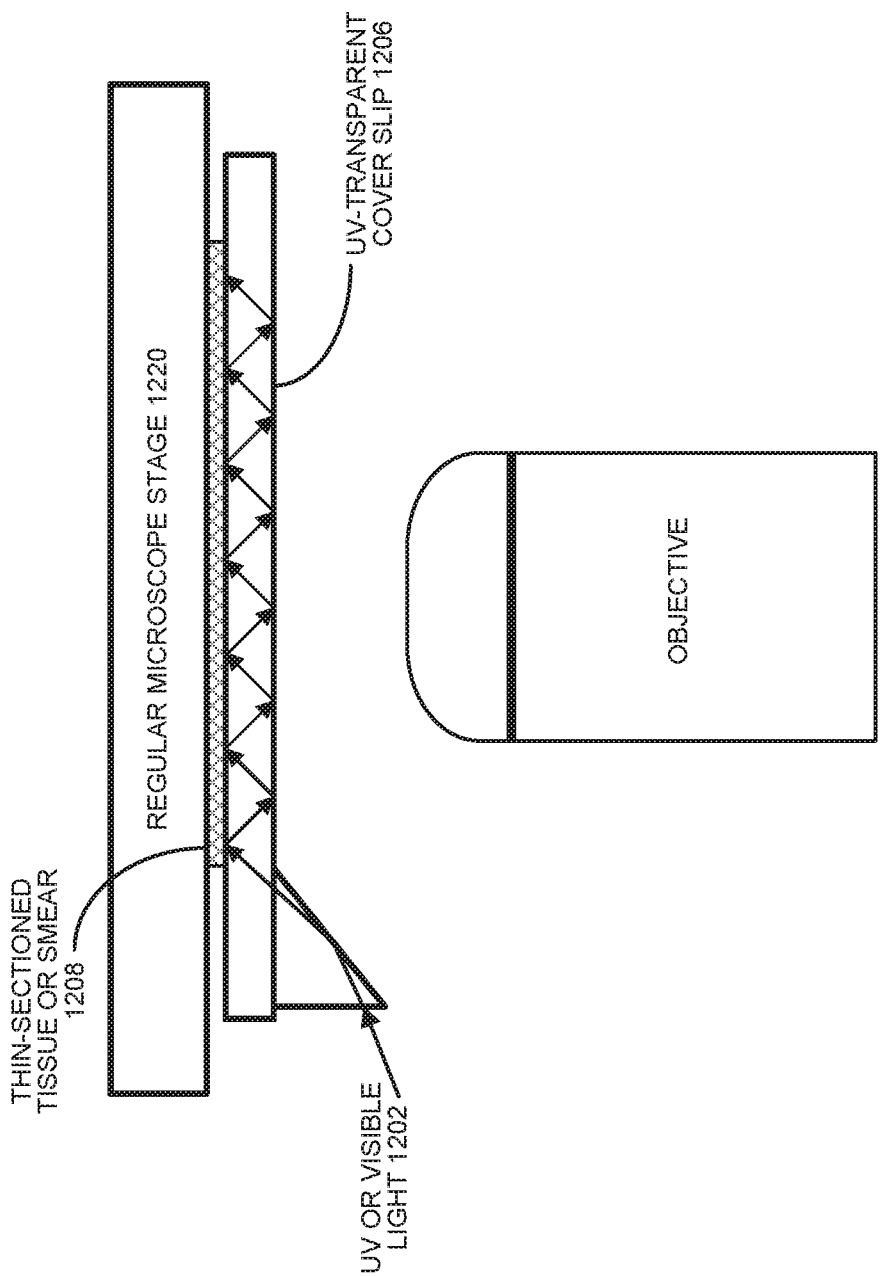
FIG. 12 illustrates a prism-based launch of excitation light at shallow angles into a UV-transparent cover slip for imaging thin-sectioned tissues in accordance with the disclosed embodiments.

As illustrated in FIG. 12, UV light or visible light 1202 can also be launched into a UV-transparent cover slip 1206, which holds a thin-sectioned tissue or smear mounted on a conventional glass slide ("thinMUSE") 1208, and is located on a regular microscope stage 1130 to be imaged by a regular microscope. For imaging unsectioned samples ("thickMUSE"), the addition of "visible" light via the waveguide can be used to excite low-abundance immunofluorescence signals, which are less bright than the general tissue stains successfully excited via UV, but are somewhat less sharp because they penetrate the tissue further than the short-wavelength UV used for morphology imaging. Also note that the microscope can be equipped with emission filters to look at any desired wavelength range or color. Alternatively, because the UV light is blocked by the optical components of the microscope, including the objectives and eyepieces, it is possible to observe the sample under illumination by eye using a regular microscope without the need for specific excitation or emission filters. Note that the UV illumination (<300 nm) can efficiently excite a very broad range of fluorescent dyes. This eliminates the need for switching filter cubes to employ different dichroic filters.

Figure 13:
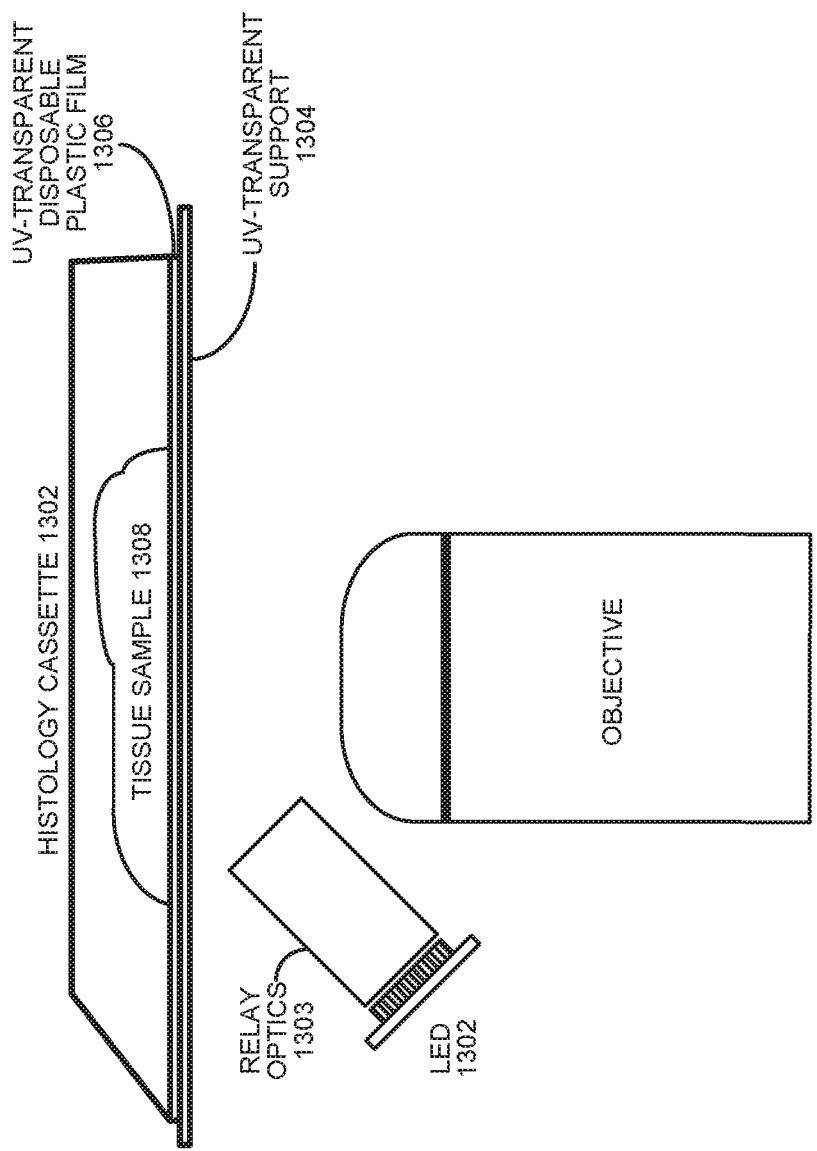
FIG. 13 illustrates oblique illumination of tissue inside a modified cassette with a UV-transparent window equipped with flexible UV-transparent film rather than a rigid optical sheet in accordance with the disclosed embodiments.

In the embodiment illustrated in FIG. 13, light is delivered to a tissue sample 1308 using an oblique illumination scheme, wherein light from LED 1302 is focused using relay optics 1303 on the tissue sample 1308, which is embedded in a modified histology cassette 1302 with a sampling window comprising a UV-transparent plastic film 1306. Note that this UV-transparent plastic film 1306 is placed against a UV transparent support 1304.

For specific applications, the tissue sample must be supported inside the cassette, such as where multiple staining steps are desired that involve repositioning the specimen after the steps take place. In these applications, a gel can be used to maintain the specimen in a fixed orientation to facilitate subsequent imaging steps. One way to accomplish this is to use agarose gels to fix the tissue in place, and then stain it with fluorescent dyes outside the cassette. This provides a way to photo-bleach or chemically bleach the tissue to eliminate unwanted dye fluorescence that might interfere with less intense subsequent immunofluorescence staining.

Moreover, thanks to the ability to modify the illumination angle in the side-launching scheme, it is possible to use other excitation wavelengths and illuminate only the surface of the tissue under an extremely sharp angle. This is beneficial when using wavelengths which can excite immune fluorescence labels more efficiently. Employing longer wavelength (for example, in visible region) enables us to observe those dyes. However, the side-launch geometry allows for surface weighted illumination, and avoids imaging deeper layers of the tissue. This makes it possible to combine side-launched UV light imaging with side-launched visible light imaging modalities to get the benefit of sharp morphology and sensitive detection.

Figure 14:
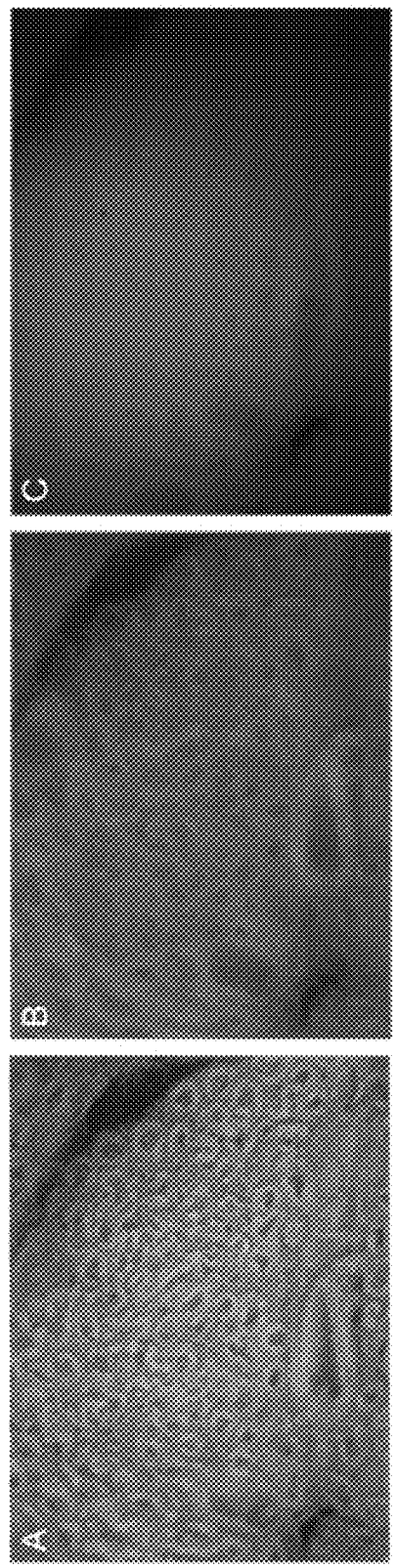
FIG. 14 presents tissue images obtained through several different illumination techniques in accordance with the disclosed embodiments.

To demonstrate the benefits of side-launched UV excitation, FIG. 14 illustrates a comparison between an image of pig kidney stained with eosin and illuminated with oblique (A) at 280 nm (B), side-launch at 465 nm, and (C) in epifluorescent mode, also at 465 nm. Note that 465-nm side-launch image displays much higher spatial contrast than 465-nm image obtained in epifluorescence (conventional) mode, but is not as good as 280 nm oblique.

The above described UV side-illumination technique provides a number of advantages. (1) The technique can be retrofitted for use in regular microscopes. As illustrated in FIG. 6, the modified histology cassette 604, which holds a tissue sample, can be placed on a stage of a regular microscope 606, and can be illuminated with either UV or visible light as needed. (2) The techniques facilitate switching between objective lenses because light sources can be moved to the sides of the waveguide, where they do not interfere with the lens-switching operations. (3) The technique facilitates the use of high NA-objectives, which have normally short working distances, which can interfere with oblique illumination geometry. (4) The disclosed embodiments also provide a modified barcode-labeled histology cassette to facilitate proper sample handling, labeling, storage, and tracking of tissue samples. A tissue sample can be stained, fixed, or otherwise processed while in a cassette, and then the cap can be replaced with a UV-transparent window to facilitate imaging. (5) The disclosed embodiments can provide a simple means for converting regular microscopes into fluorescence-capable microscopes. Note that emission filters can be employed to look at a desired wavelength range, and can be placed in existing polarization filter locations even on brightfield microscopes.

Techniques for Remediating Attenuation

Attenuation can be problematic for a system that uses side-launch illumination because as the light leaves the waveguide to illuminate the sample the light attenuates. This means portions of the sample that are nearer to the light source will be more brightly illuminated than portions of the sample that are farther from the light source.

Figure 15A:
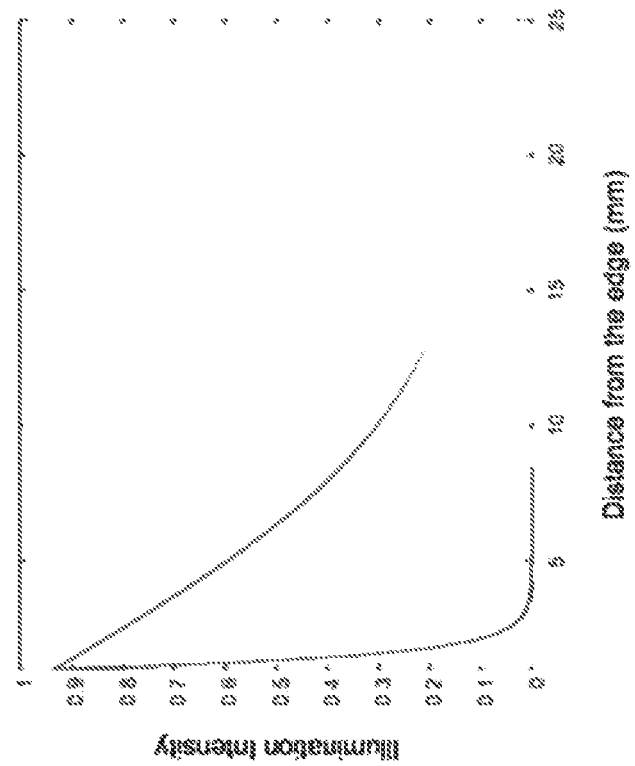
FIG. 15A presents a graph illustrating transmitted illumination versus launch-angle in accordance with the disclosed embodiments.

For the side-launch illumination, the transmission of excitation light into the tissue is highly launch-angle-dependent as illustrated in FIG. 15A. Transmission is zero until a critical angle for waveguide launch is reached and the light is able to propagate inside the waveguide. For example, for a waveguide with refractive index of 1.5 (fused silica) the critical angle is 41°. The light then travels within the waveguide without significant attenuation until it reaches the tissue, which has a refractive index of 1.3, sitting on top of the waveguide. At this point, total internal reflection no longer obtains, and light escapes into the tissue when launch angles range from, in this case 41° to 75°. Past 75°, another TIR boundary condition is met, such that the light fails to escape from the waveguide again.

Figure 15B:
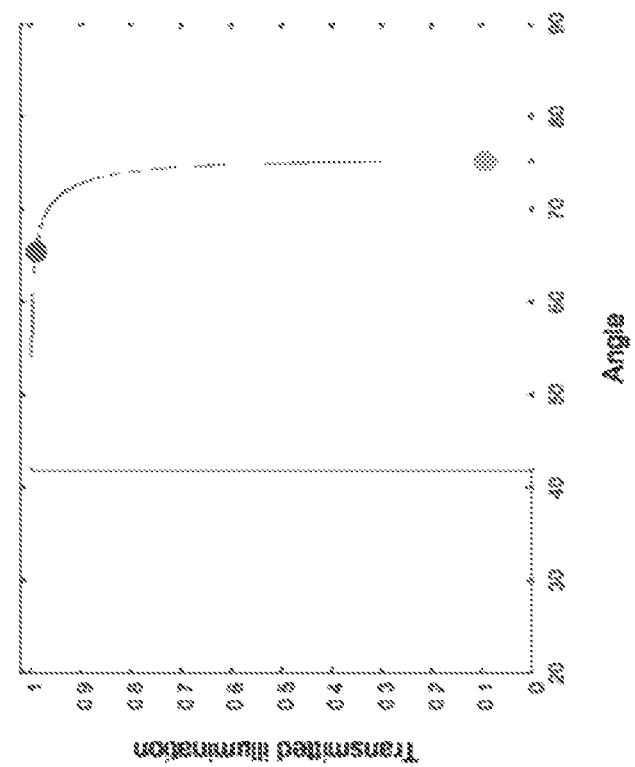
FIG. 15B presents a graph illustrating illumination intensity versus distance from the edge in accordance with the disclosed embodiments.
Figure 16:
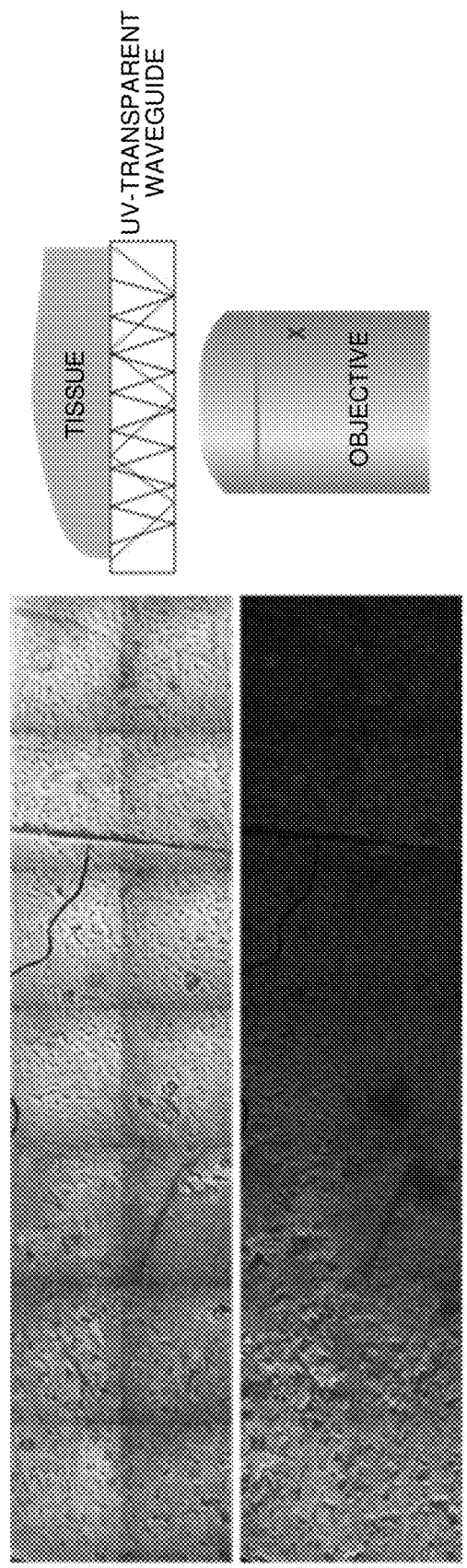
FIG. 16 illustrates a piece of tissue illuminated via both oblique and side-launched illumination in accordance with the disclosed embodiments.

The attenuation is also launch-angle dependent. As the light propagates along the waveguide, the shallower the light's angle, the less light escapes at each tissue interaction event. Hence, sharper angle light delivers more to the tissue, and at the same time its intensity decays more rapidly along the length of the waveguide, while shallower angle light, whose transmission is lower at each tissue interaction, propagates further as is shown in FIG. 15B. FIG. 15B presents a graph illustrating two intensity profiles for different initial launch angles, 65° for the left curve, and 74° for the right curve. Because shallow excitation is less intense, the overall distribution of sharp and shallow waves decays rapidly across a few mm of tissue interaction, as is shown in FIG. 16. FIG. 16 illustrates the same piece of tissue imaged via oblique illumination (with no intensity gradient), which appears in the top image in FIG. 16, and side-launch illumination, which appears in the bottom image in FIG. 16. At the left edge, both images show equivalent excitation levels, but the side-launch configuration demonstrates significant intensity decay as distance increases from the side-launch location.

Figure 17A:
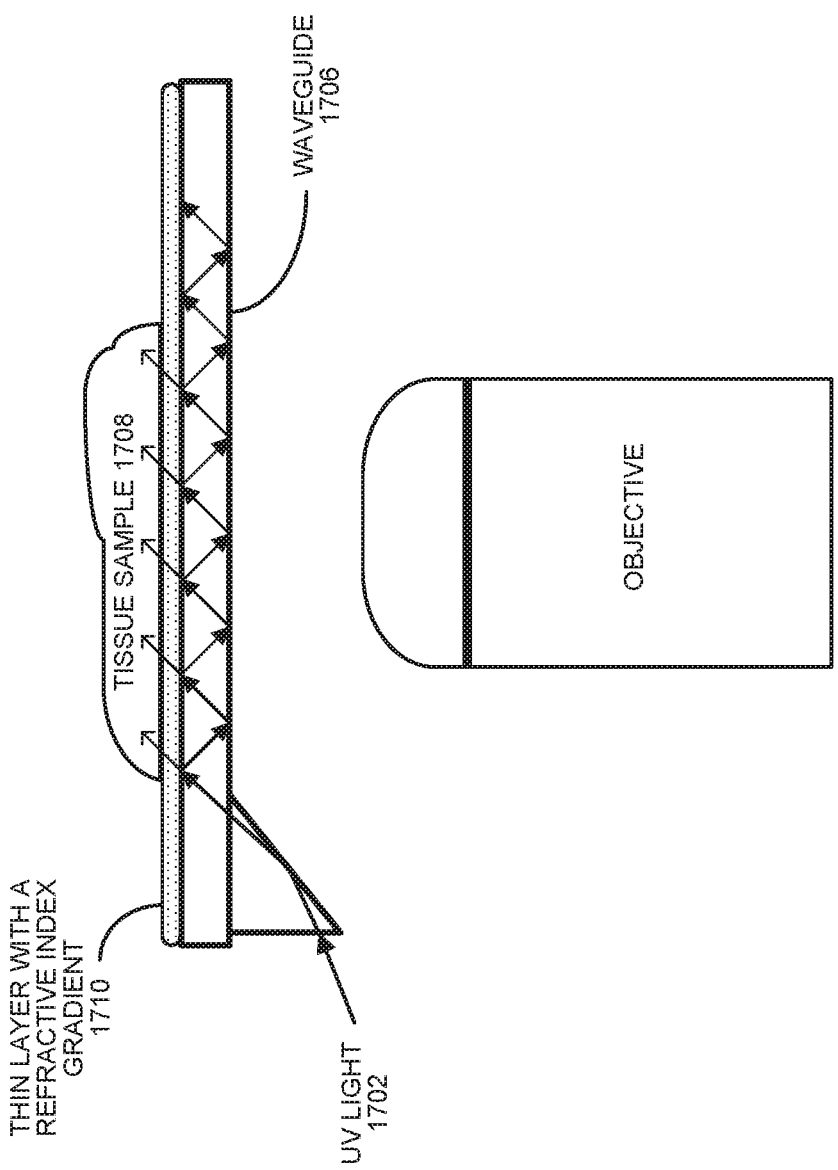
FIG. 17A illustrates a system with side-launch illumination, which uses a refractive index gradient to provide more-uniform illumination, in accordance with the disclosed embodiments.
Figure 17B:
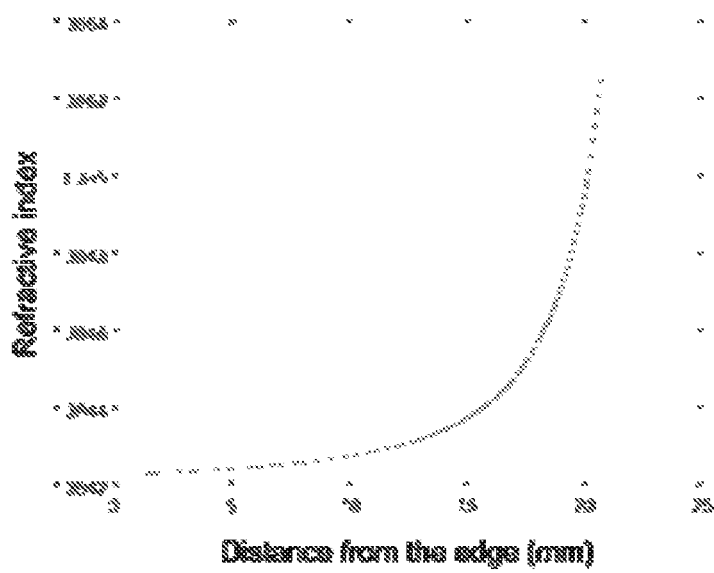
FIG. 17B presents a graph of the corresponding refractive index gradient in accordance with the disclosed embodiments.

This problem of intensity decay can be compensated for by increasing a refractive index of the waveguide along the length of the waveguide to in a manner that provides uniform illumination for the tissue sample. For example, FIG. 17A illustrates a thin layer with a refractive index gradient 1710 (about 10 μm wide), which can be printed onto a surface of a waveguide 1706. Note that the refractive index of this thin layer 1710 is graduated along its length in accordance with the graph that appears in FIG. 17B to regulate the amount of light that transmitted into the tissue at each spatial location.

Such refractive index gradients can be manufactured using inkjet distribution of nanoparticles (e.g., zirconium oxide) in defined spatial distributions in a support matrix that can range in thickness from 10 μm to 50 μm or larger. Such devices are available for custom fabrication from such companies as Vadient Optics of Beaverton, Oreg. A feasible gradient has been designed whose refractive index ranges from approximately 1.34 to 1.35 across several mm of length.

Figure 18:
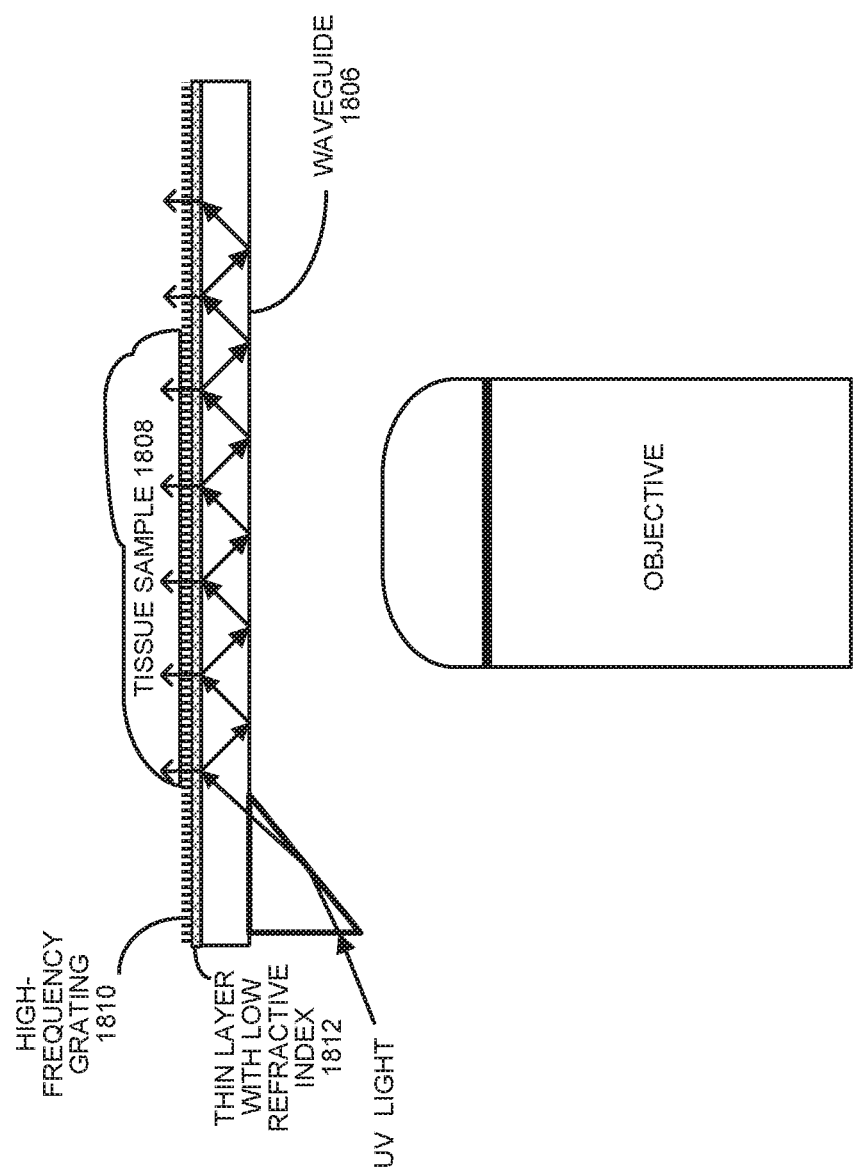
FIG. 18 illustrates a system with side-launch illumination, which uses a high-frequency etched grating to provide more-uniform illumination, in accordance with the disclosed embodiments.

In another approach, which is illustrated in FIG. 18, light can be launched at an extremely shallow angle (normally entering the tissue with very low efficiency) into a wave guide 1806 (possibly also with an increasing refractive index) that is modified on one side to have a thin layer with a non-varying low refractive index 1812, which is lower than that of the waveguide 1806. This encourages shallow-angle light to escape into the tissue with a more uniform illumination. However, as the shallow-light enters the tissue, it does not provide excitation that gives the desired depth of penetration. However, if a grating 1810 with a very high frequency (2400 grooves/mm) (or alternatively a diffuser) is placed on the top of the waveguide 1806, it can redirect the escaped light at a sharper angle into the tissue, and can thereby provide the desired excitation depth. Note that the high frequency of the grating will not interfere with emitted light of 420 nm of longer, and thus will not affect the optical quality of the captured image.

Note that the high-frequency grating 1810 illustrated in FIG. 18 can be vulnerable to washing and tissue stains. To remedy this problem, it is possible to sandwich the high-frequency grating 1810 between two UV-compatible layers, wherein the top layer acts as a protector and the bottom layer acts as a waveguide and protection layer. The overall thickness should be compatible with the employed objective for imaging, typically 170 μm.

Figure 19:
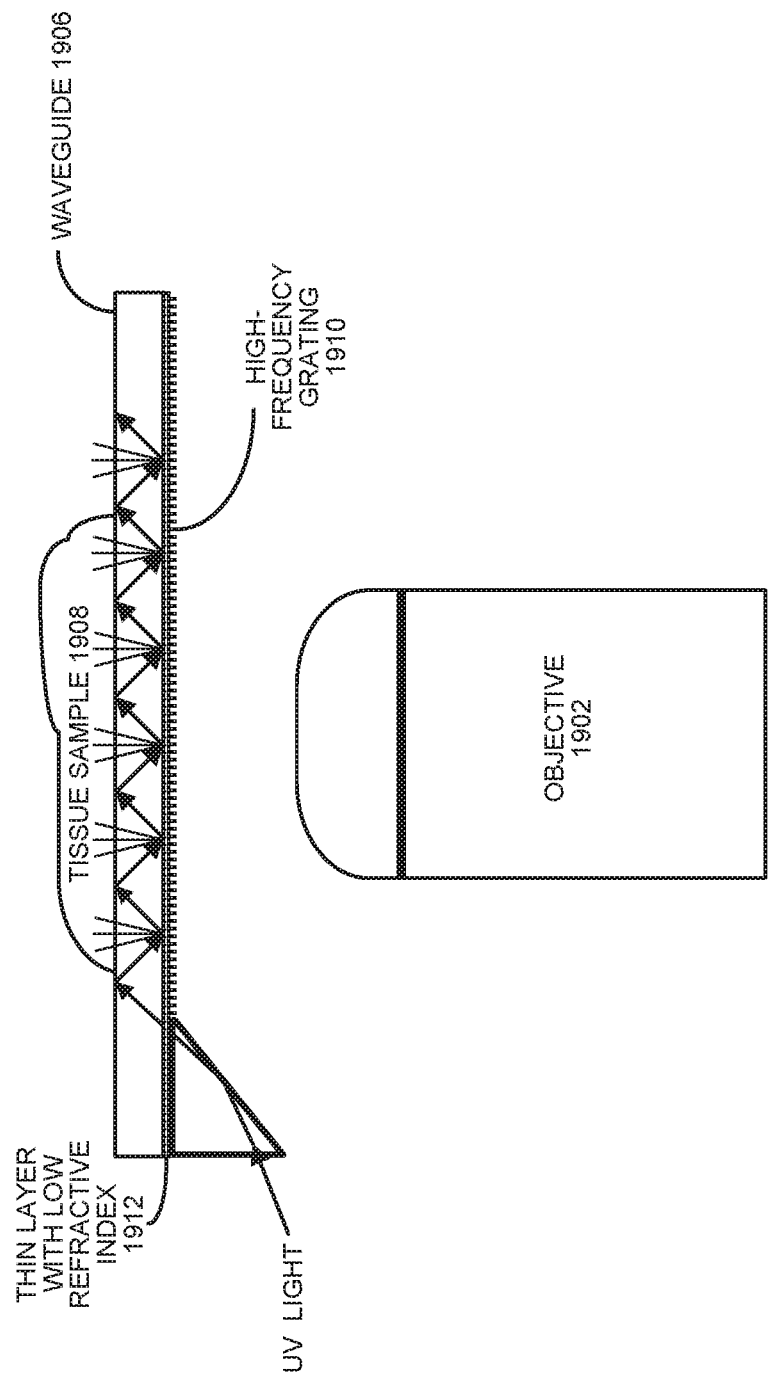
FIG. 19 illustrates a system with side-launch illumination, which locates the grating and low refractive index layer on a side of the waveguide that is closest to the objective, in accordance with the disclosed embodiments.

The system illustrated in FIG. 19 uses the same scheme as the system in FIG. 18A. However, the high-frequency grating 1910 and the thin layer with low refractive index 1912 are placed on the opposite side of the waveguide 1906, which is closer to objective 1902. A high-frequency grating 1910 (or alternatively a diffuser) directs the light into the tissue.

Other Features

It is possible to add reflective surfaces to the periphery of the waveguide to direct the excitation light that is traversing the waveguide back towards the specimen; this makes the illumination more even and brighter. The system can also support different excitation geometries, with multiple angles, multiple launch points, and circumferential geometries.

We can also combine MUSE with regular fluorescence microscopy using a standard epifluorescence microscope to direct excitation normal to the tissue surface. The resulting epifluorescence images can be combined with images acquired via MUSE side-illumination to provide a high-resolution morphology context. Moreover, it is possible to label the tissue with antibodies or other reagents in such as way as to preferentially label just the surface, so the resolution of epifluorescence imaging (even of thick specimens) can be adequate, but markedly improved with the additional information obtained through MUSE side-launch imaging. This imaging can be performed in the same tissue container as is used for the original UV imaging, or alternatively, the sample can be transferred, preferably as described below, to another microscope system if desired.

We can also use agarose or another gelling agent to immobilize a tiny fragment of tissue in a desired orientation. This can be useful to enable additional staining procedures. As the sample is pressed against the surface of the waveguide, it would become inaccessible to subsequent staining solutions. However, it is possible to remove the gel containing the sample and perform subsequent staining steps on the combined objects. Because the gel can be introduced after the sample was pressed against the waveguide, the gel material should be thin or absent over the original imaged surface. Consequently, after removal of the gel from the container, the now-exposed surface of the sample should then be physically available for subsequent staining and fixing procedures, including incubations with antibodies, and other molecular probes that can be coupled with labels detectable by fluorescence or another modality. Then, we can replace the sample-containing gel back into the cassette and re-image, either via side-launch or via oblique or epifluorescence excitation. The resulting images should be able to be registered with the original MUSE images because the orientation of the specimen will be substantially preserved. Alternatively, the removed specimen-containing gel can be imaged on a different imaging system than the MUSE imaging system.

Process for Using Side Illumination to Image Biological Material

Figure 20:
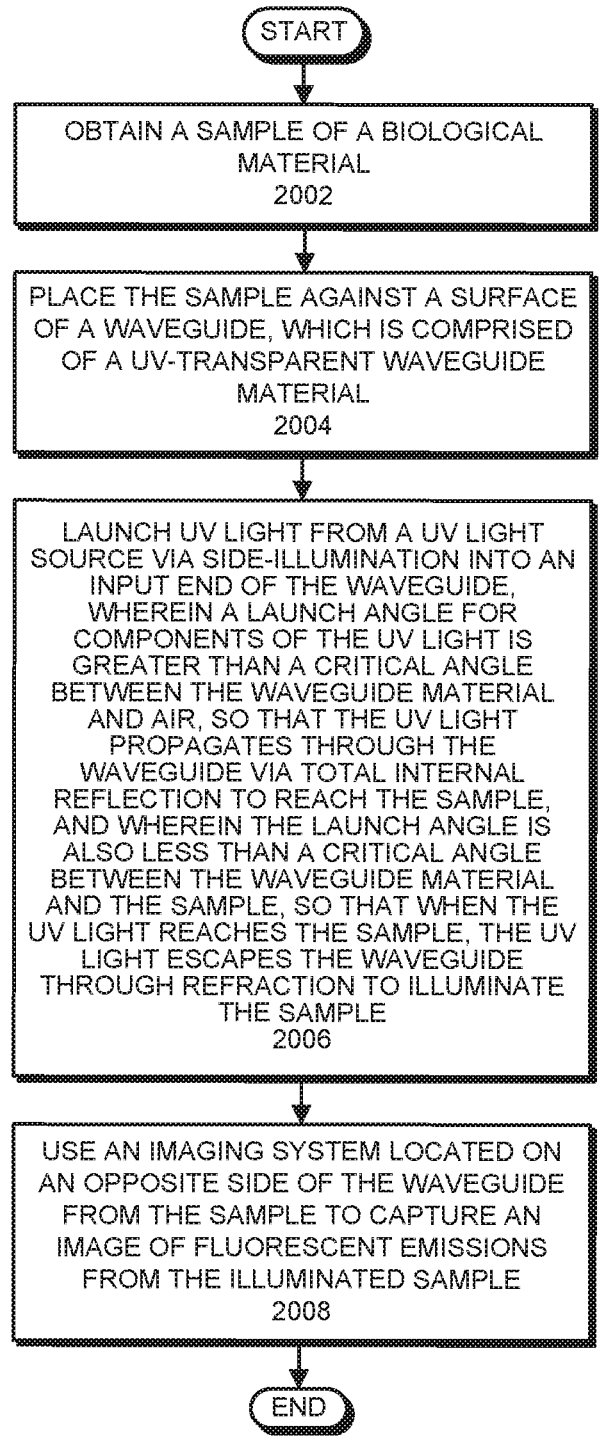
FIG. 20 presents a flow chart illustrating the process of using a waveguide-based side-illumination technique to image sample of a biological material in accordance with the disclosed embodiments.

FIG. 20 presents a flow chart illustrating the process of using side illumination to image sample of a biological material in accordance with the disclosed embodiments. During operation, the system obtains a sample of the biological material (step 2002), and exposes it optionally to one or more staining procedures. Next, the sample of the biological material is placed against a surface of a waveguide, which is comprised of a UV-transparent waveguide material (step 2004). Then, the system launches UV light from a UV light source via side-illumination into an input end of the waveguide, wherein a launch angle for components of the UV light is greater than a critical angle between the waveguide material and air, so that the UV light propagates through the waveguide via total internal reflection to reach the sample, and wherein the launch angle is also less than a critical angle between the waveguide material and the sample, so that when the UV light reaches the sample, the UV light escapes the waveguide through refraction to illuminate the sample (step 2006). Optionally, waveguides equipped either with a graded refractive index coating, high-spatial frequency gratings, or both can be used. Finally, the system uses an imaging mechanism located on an opposite side of the waveguide from the sample to capture an image of the illuminated sample mostly comprising fluorescence emissions (step 2008). (Note that the biological material can optionally be stained prior to the imaging operation.)

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for using side-illumination to image a sample of a biological material using ultra-violet (UV) light, comprising:
   obtaining the sample of the biological material;
   placing the sample against or in proximity to a surface of a waveguide, which is comprised of a UV-transparent waveguide material;
   launching UV light from a UV light source via side-illumination into an input end of the waveguide, wherein:
      a launch angle for components of the UV light is greater than a critical angle between the waveguide material and air, so that the UV light propagates through the waveguide via total internal reflection to reach the sample;
      the launch angle is less than a critical angle between the waveguide material and the sample, so that when the UV light reaches the sample, the UV light escapes the waveguide through refraction to illuminate the sample; and
      the waveguide includes a thin layer configured with a refractive index gradient and coated over the waveguide material to cause a refractive index of the waveguide to increase along a length of the waveguide to compensate for decreasing illumination intensity due to attenuation of the UV light as the UV light propagates through the waveguide;
   using an imaging system located on an opposite side of the waveguide from the sample to capture an image of the illuminated sample.

2. The method of claim 1, wherein obtaining the sample further comprises exposing the sample to one or more stains, which preferentially accumulate in the biological material or in cellular components of the biological material to facilitate fluorescent imaging.

3. The method of claim 1, wherein the waveguide includes:
   a thin layer that is fabricated on the waveguide, having a refractive index lower than the waveguide, which causes shallow-angle light to escape into the sample in a manner that provides more uniform illumination; and
   a high-frequency grating that is fabricated on the thin layer, which redirects the escaped shallow-angle light at a sharper angle to increase penetration depth into the sample.

4. The method of claim 3, wherein the high-frequency grating includes one or more protective layers to protect the high-frequency grating during washing and staining of the sample.

5. The method of claim 1, wherein the method further comprises illuminating the sample using one or more additional light sources in a spectral range from UV to near-infra-red (IR) for excitation of endogenous or exogenous fluorescent moieties.

6. The method of claim 1, wherein the UV light includes multiple wavelengths of UV excitation light.

7. The method of claim 1, wherein the waveguide comprises a UV-transparent window in a histology cassette, which encloses the sample.

8. The method of claim 1, wherein the waveguide comprises a UV-transparent microscope cover slip to facilitate imaging a sectioned sample of biological material on a microscope slide.

9. The method of claim 1, wherein launching the UV light into the waveguide involves launching the UV light into a prism, which is attached to a surface of the waveguide.

10. The method of claim 1, wherein the waveguide includes an angled internal reflective surface, and wherein launching UV light into the waveguide involves launching the UV light into a surface of the waveguide so that the UV light reflects off the angled internal reflective surface in directions substantially parallel to the surface of the waveguide.

11. The method of claim 1,
   wherein the waveguide comprises a planar waveguide with a circular shape; and
   wherein the UV light is launched into the waveguide from multiple locations along a perimeter of the waveguide.

12. The method of claim 1, wherein the waveguide is composed of one or more of the following materials:
   sapphire;
   $CaF_2$;
   fused silica;
   quartz; and
   UV-transparent plastic.

13. The method of claim 1, wherein the waveguide is transmissive in a range from 200 nm into the near-IR.

14. The method of claim 1, wherein the UV light source includes one or more of the following:
   a UV light-emitting diode (LED);
   a UV laser; and
   a UV lamp.

15. A system that uses side-illumination to image a sample of a biological material using ultra-violet (UV) light, comprising:
   a waveguide, which is comprised of a UV-transparent waveguide material, wherein the system is configured so that a sample of a biological material can be placed on a surface of the waveguide;
   a UV light source;
   a launching mechanism, which launches UV light from the UV light source via side-illumination into an input end of the waveguide, wherein:
      a launch angle for components of the UV light is greater than a critical angle between the waveguide material and air, so that the UV light propagates through the waveguide via total internal reflection to reach the sample;
      the launch angle is less than a critical angle between the waveguide material and the sample, so that when the UV light reaches the sample, the UV light escapes the waveguide through refraction to illuminate the sample; and
      the waveguide includes a thin layer configured with a refractive index gradient and coated over the waveguide material to cause a refractive index of the waveguide to increase along a length of the waveguide to compensate for decreasing illumination intensity due to attenuation of the UV light as the UV light propagates through the waveguide;

an imaging system located on an opposite side of the waveguide from the sample, which is used to capture an image of the illuminated sample.

16. The system of claim 15, wherein the waveguide includes:
   a thin layer that is fabricated on the waveguide, having a refractive index lower than the waveguide, which causes shallow-angle light to escape into the sample in a manner that provides more-uniform illumination; and
   a high-frequency grating that is fabricated on the thin layer, which redirects the escaped shallow-angle light at a sharper angle to increase penetration depth into the sample.

17. The system of claim 16, wherein the high-frequency grating includes one or more protective layers to protect the high-frequency grating during washing and staining of the sample.

18. The system of claim 15, further comprising one or more additional light sources for illuminating the sample in a spectral range from UV to near-infra-red (IR) for excitation of endogenous or exogenous fluorescent moieties.

19. The system of claim 15, wherein the UV light includes multiple wavelengths of UV excitation light.

20. The system of claim 15, wherein the waveguide comprises a UV-transparent window in a histology cassette, which encloses the sample.

21. The system of claim 15, wherein the waveguide comprises a UV-transparent microscope cover slip to facilitate imaging a sectioned sample of biological material on a microscope slide.

22. The system of claim 15, wherein the launching mechanism comprises a prism, which is attached to a surface of the waveguide and is configured to direct the UV light into the waveguide.

23. The system of claim 15, wherein the waveguide includes an angled internal reflective surface, and wherein the launching mechanism launches the UV light into a surface of the waveguide so that the UV light reflects off the angled internal reflective surface in directions substantially parallel to the surface of the waveguide.

24. The system of claim 15,
   wherein the waveguide comprises a planar waveguide with a circular shape; and
   wherein the launching mechanism launches the UV light into the waveguide from multiple locations along a circular perimeter of the waveguide.

25. The system of claim 15, wherein the waveguide is composed of one or more of the following materials:
   sapphire;
   $CaF_2$;
   fused silica;
   quartz; and
   UV-transparent plastic.

26. The system of claim 15, wherein the waveguide is transmissive in a range from 200 nm into the near-IR.

27. The system of claim 15, wherein the UV light source includes one or more of the following:
   a UV light-emitting diode (LED);
   a UV laser; and
   a UV lamp.

* * * * *